United States Patent [19]

Solbeck

[11] Patent Number: 5,219,583
[45] Date of Patent: Jun. 15, 1993

[54] APPARATUS FOR SECURING FITTINGS IN A THERMOPLASTIC FOIL WEB

[75] Inventor: Peter Solbeck, Rungsted Kyst, Denmark

[73] Assignee: Polysheet A/S, Herlev, Denmark

[21] Appl. No.: 777,266

[22] PCT Filed: Jul. 5, 1990

[86] PCT No.: PCT/DK90/00171
§ 371 Date: Dec. 3, 1991
§ 102(e) Date: Dec. 3, 1991

[87] PCT Pub. No.: WO91/00801
PCT Pub. Date: Jan. 24, 1991

[30] Foreign Application Priority Data

Jul. 7, 1989 [DK] Denmark .............................. 3372/89

[51] Int. Cl.5 .................... B29C 67/12; B29C 47/02; B29C 43/28
[52] U.S. Cl. .................................... 425/114; 156/363; 156/555; 156/566; 156/573; 425/145; 425/148; 425/166; 425/363
[58] Field of Search ............... 425/115, 113, 114, 121, 425/126.1, 145, 148, 382.3, 363, 367, 136, 173, 166, 169; 264/40.7, 175; 156/556, 566, 569, 363, 573, 555, 500

[56] References Cited

U.S. PATENT DOCUMENTS

| 3,130,106 | 4/1964 | Bornand | 156/569 |
| 3,219,507 | 11/1965 | Penman | 156/244 |
| 3,671,363 | 6/1972 | Bruder | 156/556 |
| 3,909,340 | 9/1975 | Solbeck | 156/500 |
| 4,455,188 | 6/1984 | Stormby | 156/363 |
| 4,502,910 | 3/1985 | Voltmer et al. | 156/363 |
| 4,680,080 | 7/1987 | Instance | 156/363 |

FOREIGN PATENT DOCUMENTS 130239 1/1975 Denmark .

Primary Examiner—Jay H. Woo
Assistant Examiner—Khenh P. Nguyen
Attorney, Agent, or Firm—Beveridge, DeGrandi, Weilacher & Young

[57] ABSTRACT

An apparatus for manufacturing a foil web of a thermoplastic with locally secured fittings, for use as tarpaulins or similar articles. The apparatus includes an extruder head with an entirely or mainly downwardly directed ejection orifice and two counterrotating rollers with a nip for calibrating the extruded foil. In a feeding device with a vertical supply magazine, a stack of fittings is accommodated and a guiding device is used to guide fittings into a discharge duct extending towards the roller nip. The guiding device is electrically operated and an electrically controlled stop member with an associated fitting sensing element are arranged at the lowermost end of the discharge duct towards the roller nip for accurate control of the supply of fittings to the roller nip through controlled stopping and releasing of the fitting element as well as the monitoring of fittings in the discharge duct. The discharge duct is arranged in such a relationship to the counterrotating rollers that each fitting is supplied from the mouth of the discharge duct to the roller nip by substantially a free fall.

20 Claims, 3 Drawing Sheets

APPARATUS FOR SECURING FITTINGS IN A THERMOPLASTIC FOIL WEB

BACKGROUND DISCUSSION

The invention relates to an apparatus for manufacturing a foil web of a thermoplastic with locally secured fittings for use as tarpaulins or similar articles, comprising an extruder head with an entirely or mainly downwards directed ejection orifice and two counterrotating rollers or similar members arranged below the ejection orifice, at least one of said rollers or members being cooled, said rollers or members forming between them a nip for calibrating the extruded foil, and a feeding device with an entirely or mainly vertical supply magazine for accomodating a stack of fittings, a discharge duct extending from the bottom of the supply magazine in a direction towards the roller nip and a guiding device for guiding the lowermost fitting in the magazine into the discharge duct.

An apparatus of this kind, which is used for example for the fastening of eyelets in a plastic foil web, which is subsequently to be cut in suitable lengths for production e.g. of tarpaulins for covering purposes in construction works is known from DK-published patent application No. 130 239.

In this prior art apparatus the guiding device formed as a reciprocating slide is driven by a hydraulic or pneumatical working cylinder and the discharged duct of the feeding device is arranged and designed in such a way that the supplied fittings are guided from the mouth of the duct towards the roller nip by the cooled roller.

Thereby, it is only possible to obtain a relatively inaccurate positioning of the fitting in the foil web, since the velocity with which the fittings are supplied from the mouth of the discharged duct is mainly determined by the stroke velocity of the slide.

The ejection of fittings may thereby in an unpredictable way take place at such a velocity, that the fittings strike holes in the soft foil web.

When a number of feeding devices arranged on a line in the axial direction of the rollers are used for fastening fittings along a corresponding line in the foil web in one operation, local differences in the surface character of the cooled roller has moreover led to a releatively inaccurate supply of the fittings of the roller nip.

Whereas these disadvantages have to a certain extent been acceptable in case of foil tarpaulins for singular use, they are not acceptable, when a greater number of tarpaulins are used for covering in construction works and arranged with overlapping edges since the said inaccuracies entail that the eyelets along the overlapping edges cannot be positioned opposite each other.

SUMMARY OF THE INVENTIQN

It is the object of the invention to provide an apparatus of the kind referred to, by which the said disadvantages are avoided so that the fittings are positioned with a great accuracy in the foil web and at a substantially higher working speed than has been possible in the above mentioned prior art apparatus, while at the same time a very high safety against malfunction, e.g. failing supply of fittings from one or more of a number of feeding devices, is obtained and thereby a considerable reduction of the rejection percentage.

To achieve this an apparatus according to the invention as characterized in that the guiding device is electrically operated and an electrically controlled stop member with an associated fitting sensing element are arranged in the vicinity of the lowermost end of the discharge duct towards the roller nip for accurate control of the supply of fittings to the roller nip and minitoring the presence of fittings in the discharge duct, the discharge duct being arranged in such a relationship to said counter rotating rollers that each fitting is supplied from the mouth of the discharge duct to the roller nip by a substantially free fall.

Thereby, in addition to a more accurate control of the movement per se of the guiding device, the advancement of fittings from the mouth of the discharge duct to the roller nip will be independent of the movement of the guiding device as well as the surface character of the roller and may thereby be controlled with a uniform and constant speed in such a way that damage to the foil web is avoided also in cases, where a great number of feeding devices are arranged on a line in the axial direction of the rollers.

Moreover, by means of the fitting sensing member it is to a large extent made sure that a fitting will always be present in the discharge duct prior to operation of the controlled stop member.

This safety may be further improved in that a further controlled stop member with an associated fitting sensing element is arranged as a buffer device a distance above said stop member, said sensing element being connected via a control circuit to an operating device for said guiding device.

BRIEF DESCRIPTION OF THE DRAWINGS

In the following the invention will be further explained with reference to the schematical drawing in which.

DETAILED DESCRIPTION OF THE DRAWINGS

Figure 1:
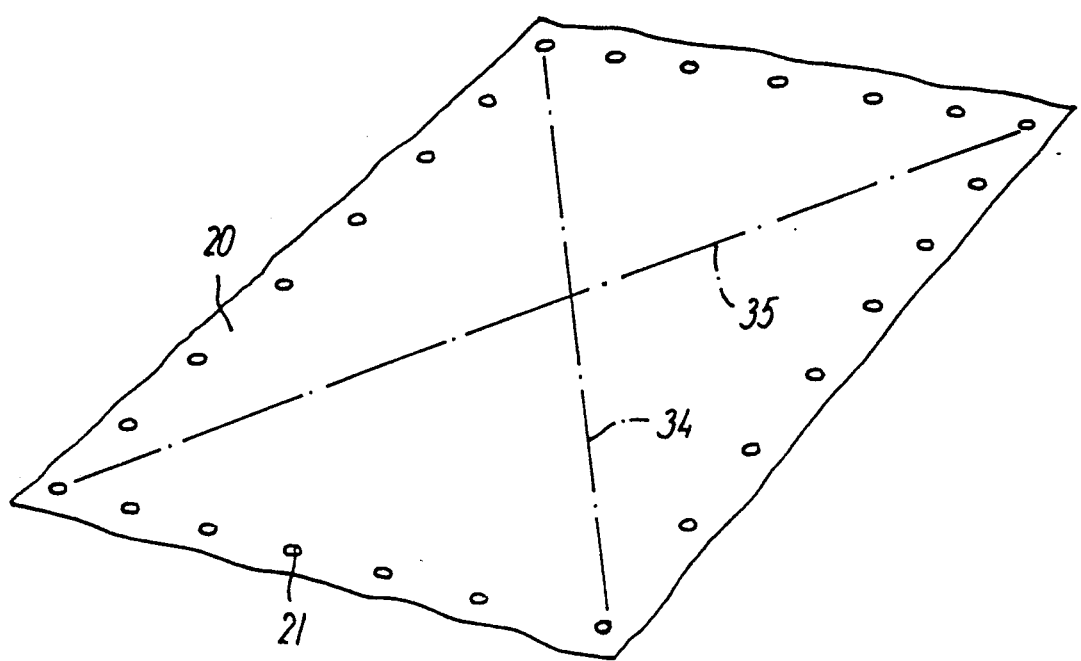
FIG. 1 shows an example of a tarpaulin with locally fastened eyelets cut out from a reinforced thermoplastic foil web.

FIG. 1 shows an example of a tarpaulin 20 cut out from a net reinforced web of thermoplastic foil such as polyethylene foil having a rectangular shape and being provided with eyelet fittings 21 fastened at separated positions along all edges of the tarpaulin.

Figure 2:
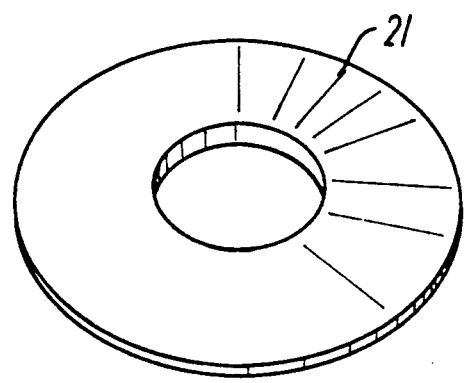
FIGS. 2 and 3 shows an example of an eyelet fitting, FIG. 4 a preferred embodiment of an apparatus according to the invention, and FIG. 5 a simplified control diagram.
Figure 3:
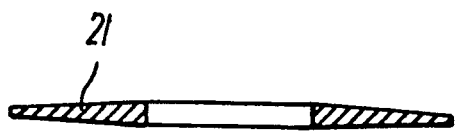

In FIGS. 2 and 3 an example is shown of an eyelet fitting 21 in the form of a flat circular disc with a central eyehole extending through approximately one third of the diameter of the disc. As shown in FIG. 3 the thickness of the disc decreases towards a rather thin edge at the circumference of the disc such as known per se from the above-mentioned Danish published patent application No. 130239.

The eyelet fitting 21, which is preferably manufactured from a cast molded plastic constitutes, however, only an example of such fittings, which may be fastened to a foil web by means of an apparatus according to the invention. As further possible forms of such fittings, which may also be manufactured from metal or other materials, shackles, buckles or hooks may be mentioned.

Figure 4:
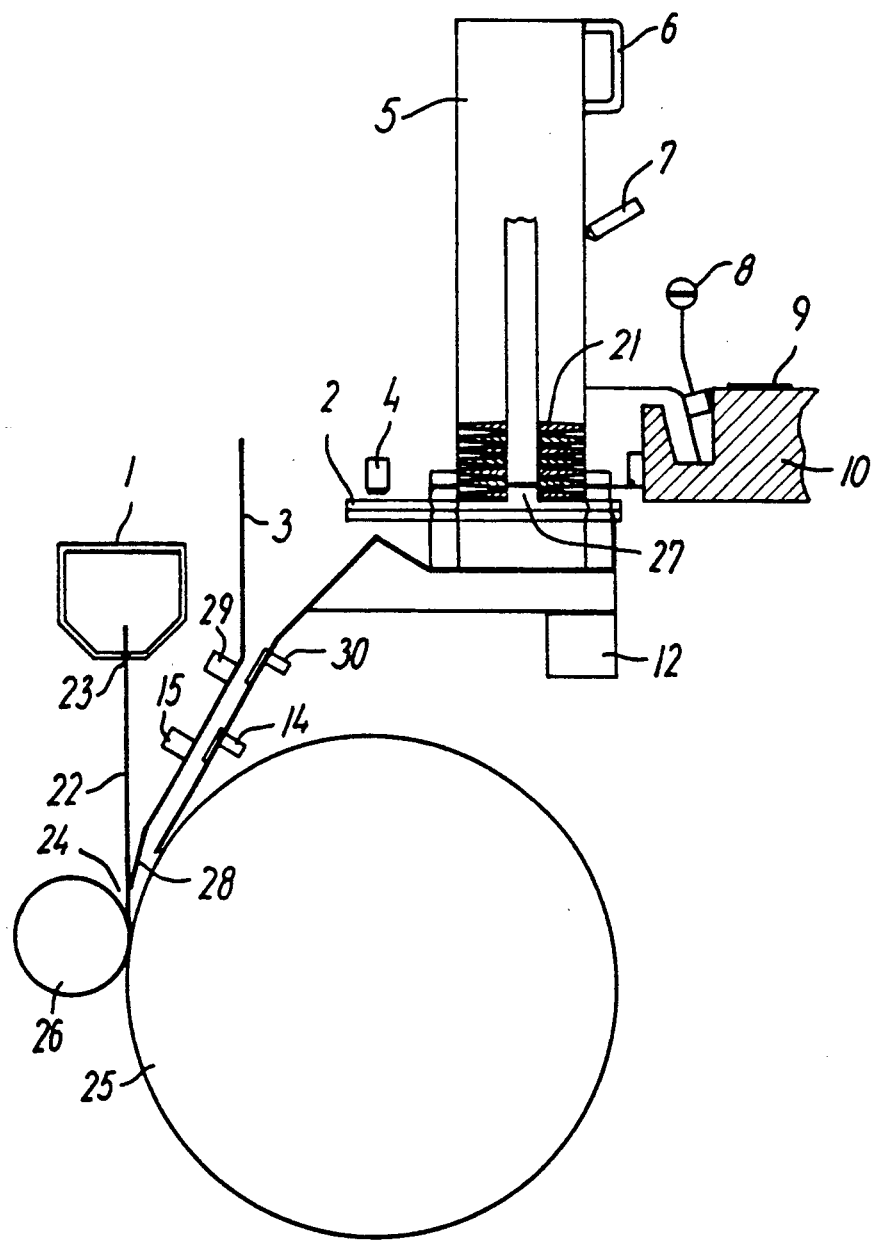

In the embodiment of the apparatus shown in FIG. 4 the foil web 22 consisting of a thermoplastic is extruded from an extruder head 1 formed as a wide slit ejector and having a downwards directed ejection orifice 23 towards the roller nip 24 between two counterrotating rollers 25 and 26 arranged below the ejection orifice, at least one roller 25 being a cooled roller.

The apparatus comprises a tubular and substantially vertical supply magazine file arranged above the cooled roller 25 for accomodating a stack of eyelet fittings 21 having a form as shown in FIGS. 2 and 3.

By means of a reciprocating slide 2 operated by an electric motor 12 with an associated gearbox through a connecting rod mechanism not shown and having an upwardly directed projection 27 matching the central hole in the eyelet fittings 21, the lowermost fitting in the stack in the magazine 5 may be guided outside the magazine to a position, in which it is detached from the slide 2 by means of a detaching device 4 and at the return movement of the slide 2 falls down in the upper end of a slidlike discharge duct 3.

The discharge duct 3 extends mainly linearly through an inclination of substantially 70° with the horizontal downwards towards the roller nip 124 with its mouth positioned immediately above the roller nip.

At its mouth the duct 3 has a guiding plate 28 for accurately guiding the direction of an eyelet supplied from the duct towards the roller nip 24.

In the vicinity of the lowermost end of the discharge duct 3 an electrically controlled stop member 15, is arranged and immediately above this a sensing element 14 for sensing the presence of fitting 21 at the position in the duct 3 determined by the stop member 15.

At a position upstream in the duct 3 a further electrically controlled stop member 29 with an associated sensing element 30 is arranged as a buffer device.

In order to sense the height of the stack of fittings in the magazine 5 a sensing element 7 is provided in connection therewith.

For the purpose of manually moving the entire feeding device, the magazine 5 is further provided with a handle 6.

By means of a locking device 8 the feeding device may be locked in any desired position along a mounting bar 10 extending parallel to the axial direction of the rollers 25 and 26, on the other side of which a yardstick may be provided for accurate positioning of a number of feeding devices side by side on a line parallel to said axial direction.

The feeding devices may be positioned as closely on the mounting bar 10 as the width of the individual feeding device allows e.g. with a mutual separation down to 14 cms.

Figure 5:
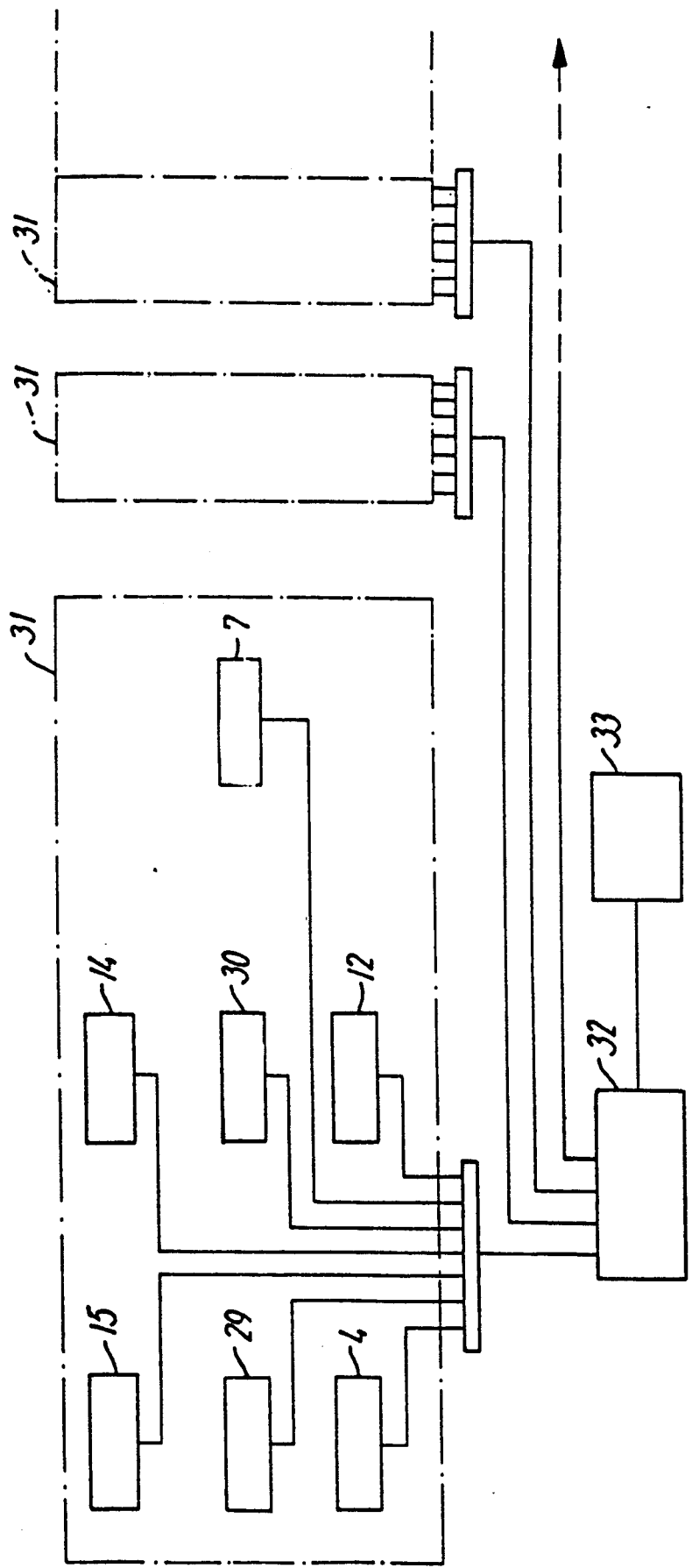

As shown in the diagram in FIG. 5 several feeding devices may be controlled by means of a common electronic control device 32 such as a PLC/PPC-control circuit receiving signals from sensing elements 7, 14 and 30 in each feeding device and generating energizing signals for the motor 12, the detaching device 4 and for release of the stop members 15 and 29 in response to such signals.

An alarm device 33 may be connected to the control device 32 for generating a visual and/or acustical alarm signal, when the height of the stack of fittings in the supply magazine 5 of a feeding device falls below a level corresponding to the position of the sensing element 7. Correspondingly, the control device may be programmed to generate an alarm signal if no fitting reaches the stop member 29 in spite of repeated operation of the motor 12 and the detaching device 4.

The control device 32 may be programmed for accurate positioning of fittings in the foil web 22 in any desired configuration, e.g. also along diagonal lines as shown at 34 and 35 in FIG. 1.

In itself, generation of the reciprocating movement of the slide 2 by means of a connecting rod mechanism operated by an electric motor provides high safety for the slide to gripping the lowermost eyelet in the stack of fittings in the magazine 5 during each stroke and for detaching this eyelet from the slide by means of the detaching device 4 since the relevant extreme positions of the slide correspond to the dead points in the connecting rod movement.

A further improved safety may be provided by a arranging the control device to operate the electric motor 12 so as to be briefly stopped in diametrically opposite rotor positions corresponding to said extreme positions.

The electric motor 12 may be a controlled DC-motor or a step motor, in which latter case a high accuracy may be obtained by adjustment of the pulse shape and frequency for the control pulses.

What is claimed is:

1. An apparatus for manufacturing a foil web with locally secured fittings, comprising:
   an extruder head with an ejection orifice through which foil is extruded;
   a pair of counterrotating rollers positioned below said ejection orifice, said pair of counterrotating rollers defining a nip therebetween for calibrating the extruded foil;
   a feeding device having a supply magazine for accommodating a stack of fittings;
   a discharge duct extending away from said supply magazine in a direction towards said nip;
   a guiding device for guiding a fitting from a storage position within said supply magazine to said discharge duct;
   a first controlled stop member for stopping and releasing a fitting in said discharge duct; and
   a first fitting sensor for monitoring the presence of a fitting in said discharge duct, and said first fitting sensor being associated with said first controlled stop member for controlling a supply of fittings to the roller nip, and said discharge duct being arranged in relationship to said pair of counterrotating rollers such that each fitting released by said first stop member freely falls from an exit mouth of said discharge duct to said roller nip.

2. An apparatus as recited in claim 1 further comprising a control circuit, a second controlled stop member and a second fitting sensor, said second stop member being dimensioned and arranged to stop a fitting in said discharge duct at a position above said first stop member, and second fitting sensor being dimensioned and arranged for monitoring whether a fitting is stopped by said second stop member, said first stop member, and said second sensor being connected via the control circuit to said guiding device.

3. An apparatus as recited in claim 2 further comprising an alarm device connected to said control circuit for actuating an alarm upon said second sensor detecting a lack of a fitting having been positioned at said second stop member.

4. An apparatus as recited in claim 1 wherein said discharge duct extends essentially linearly from said feeding device to said exit mouth positioned a short distance from said roller nip, and said discharge duct including a guide plate at said exit mouth for accurately guiding a direction of travel for the fitting.

5. An apparatus as recited in claim 4 wherein said discharge duct has an inclination of essentially 70° with respect to a horizontal plane.

6. An apparatus as recited in claim 1 wherein said discharge duct extends essentially linearly from said feeding device to said exit mouth positioned a short distance from said roller nip, and said discharge duct including a guide plate at said exit mouth for accurately guiding a direction of travel for the fitting.

7. An apparatus as recited in claim 6 wherein said discharge duct has an inclination of essentially 70° with respect to a horizontal plane.

8. An apparatus as recited in claim 2 wherein said feeding device with associated discharge duct is mounted for lateral displacement along a line parallel with an axial axis of said rollers, and said apparatus includes a lock for locking said feeding device in a desired position.

9. An apparatus as recited in claim 1 wherein said feeding device with associated discharge duct is mounted for lateral displacement along a line parallel with an axial axis of said rollers, and said apparatus includes a lock for locking said feeding device in a desired position.

10. An apparatus as recited in claim 3 further comprising a third sensor for sensing a height level of the fittings in said stack of fittings.

11. An apparatus as recited in claim 2 further comprising a third sensor for sensing a height level of the fittings in said stack of fittings.

12. An apparatus as recited in claim 1 further comprising a height sensor for sensing a height level of fittings in said stack of fittings.

13. An apparatus as recited in claim 2 wherein said guiding device includes a reciprocating slide, a detaching member, and means for moving said slide between a first extreme position wherein said slide grips a fitting from said stack of fittings and a second extreme position wherein the gripped fitting is received by said detaching member and placed into said discharge duct.

14. An apparatus as recited in claim 13 wherein said reciprocating slide is positioned below said supply stack and includes an upwardly directed projection dimensioned and arranged for extension through an aperture in a lowermost fitting arranged in said supply stack.

15. An apparatus as recited in claim 1 further comprising a common control unit and a plurality of feeding devices with associated discharge ducts arranged in predetermined positions along a line parallel with an axial axis of said rollers, and said apparatus further comprising a plurality of first sensors and a plurality of first stop members with each of said feeding devices including one of said plurality of first sensors and one of said plurality of first stop members, and said plurality of first sensors and first stop members being in communication with said common control unit.

16. An apparatus for manufacturing a foil web with locally secured fittings, comprising:

an extruder head with an ejection orifice through which foil is extruded;

a first and a second roller positioned below said ejection orifice and being adapted for counterrotating motion so as to define a nip therebetween for calibrating the extruded foil;

feeding devices spaced along a line extending parallel to a rotating axis of said first roller, each of said feeding devices having a source of fittings; and discharge ducts with each discharge duct extending from a respective one of said feeding devices in a direction towards said nip; and each discharge duct including an exit mouth positioned such that a fitting exiting said exit mouth freely falls into said nip;

guiding means for guiding fittings from the source of fittings to said discharge ducts;

first controlled stop members for stopping and releasing fittings, and each said discharge ducts each including a first controlled stop member; and first sensors for sensing fittings stopped by said first stop members; and a common control unit in communication with said first stop members and said first sensors for controlling a supply of fittings to said nip.

17. An apparatus as recited in claim 16 further comprising second sensors and second stop members, said second stop members being positioned within said discharge ducts, and said second stop members being dimensioned and arranged to stop and release fittings in a position upstream from said first stop members with respect to a direction of fitting travel in said discharge ducts and said second stop members and said second sensors being in communication with said common control unit for controlling a supply of fittings from said second stop members to said first stop members.

18. An apparatus as recited in claim 17 further comprising third sensors for monitoring an amount of fittings in said feeding devices.

19. An apparatus for manufacturing a thermoplastic web having fitting elements secured thereon, said apparatus comprising an extruded head having a downwardly directed extrusion orifice; two counterrotating rollers disposed beneath said extrusion orifice and defining a nip therebetween for receiving a thermoplastic foil extruded from the orifice; a feeding device having a substantially vertical supply magazine accommodating a stack of the fitting elements; a discharge duct extending from a bottom portion of said supply magazine to the roller nip for feeding the fitting elements to said roller nip; and a guiding device for guiding a lowermost fitting element in the magazine into the discharge duct, wherein the improvement comprises a first electrically controlled stop member and a first fitting element sensor, said first electrically controlled stop member and said first stop member being positioned at a lowermost end of said discharge duct towards said roller nip for both controlling a supply of fitting elements to said roller nip and monitoring for fitting element presence in said discharge duct, and said rollers being arranged such that fitting elements freely fall from an exit mouth of the discharge duct to the roller nip upon being released by said first stop member.

20. An apparatus as recited in claim 19 characterized in that said apparatus includes a second controlled stop member with associated second fitting element sensor arranged for stopping and releasing fittings positioned above said first controlled stop member and within said discharge duct.

* * * * *